United States Patent [19]
Yoshida et al.

[11] Patent Number: 5,588,697
[45] Date of Patent: Dec. 31, 1996

[54] TABLE MEANS FOR VEHICLE

[75] Inventors: Masami Yoshida, Utsunomiya; Hidetsugu Okazaki, Wako, both of Japan

[73] Assignees: Tokyo Seat Corporation, Saitama-ken; Honda Giken Kogyo Kabushiki Kaisha, Tokyo, both of Japan

[21] Appl. No.: 445,301

[22] Filed: May 19, 1995

[30] Foreign Application Priority Data

May 23, 1994 [JP] Japan ................................. 6-133788

[51] Int. Cl.⁶ ........................... A47B 39/04; A47B 83/02
[52] U.S. Cl. ............... 297/173; 297/188.02; 297/188.01; 297/188.17; 108/47; 108/48; 108/160
[58] Field of Search ..................... 297/173, 188.17, 297/188.01, 188.02, 147; 108/128, 160, 47, 48

[56] References Cited

U.S. PATENT DOCUMENTS

| | | | |
|---|---|---|---|
| 2,556,724 | 6/1951 | Hubsch | 297/173 |
| 2,911,272 | 11/1959 | Edwards | 297/173 |
| 3,129,032 | 4/1964 | Meyer et al. | 208/47 X |
| 4,040,659 | 8/1977 | Arnold | 27/188.17 |
| 4,378,107 | 3/1983 | Wagster et al. | 108/160 X |
| 4,417,764 | 11/1983 | Marcus et al. | 297/188.17 |
| 4,475,267 | 10/1984 | Hathaway | 108/160 X |
| 4,512,503 | 4/1985 | Gioso | 297/188.2 X |
| 4,756,572 | 7/1988 | Dykstra et al. | 297/188.17 |
| 4,828,211 | 5/1989 | McConnell et al. | 297/188.2 X |
| 4,848,244 | 7/1989 | Bennett | 108/48 X |
| 5,060,899 | 10/1991 | Lorence et al. | 297/188.01 X |
| 5,171,061 | 1/1992 | Maruissen | 297/188.17 |
| 5,297,767 | 3/1994 | Miller et al. | 297/188.17 X |
| 5,458,395 | 10/1995 | Skarda, Jr. | 297/173 X |

FOREIGN PATENT DOCUMENTS 1540576  2/1979  United Kingdom ............... 208/48

*Primary Examiner*—Peter M. Cuomo
*Assistant Examiner*—Rodney B. White
*Attorney, Agent, or Firm*—Dann, Dorfman, Herrell and Skillman, P.C.

[57] ABSTRACT

A table device for a vehicle comprises a table body, a support mechanism for attaching to a side of a vehicle seat for pivotally supporting the table body, a linkage mechanism provided between the table body and the support mechanism for facilitating maintaining of the table body in a horizontal state during use of the table body and facilitating collapsing of the table body after use of the table body, and an operating mechanism for operating the linkage mechanism.

16 Claims, 8 Drawing Sheets

TABLE MEANS FOR VEHICLE

BACKGROUND OF THE INVENTION

1. Field of the Invention

This invention relates to an improvement of table means for a vehicle, and more particularly to table means provided at a vehicle seat as means to carry any desired articles, for example, cups, packs of cigarettes, cans of coffee, cans of juice, coin purses, wallets, road maps and the like.

2. Description of the Prior Art

In general, a table for allowing any desired articles to be put thereon is provided at a rear side of a seat back of a front seat, driver's seat or assistant driver's seat in a vehicle. This conventional table is for the exclusive use of a fellow passenger who has sat on a back seat in the vehicle. The table in use is adapted to be projected toward the fellow passenger, so that the table will confine a space before the fellow passenger who has sat on the back seat.

SUMMARY OF THE INVENTION

It is a principal object of this invention to provide table means for carrying any desired artcles, which will ensure an available use of a space inside a vehicle.

It is another object of this invention to provide table means which will not confine a space before a fellow passenger who has sat on a back seat in a vehicle.

It is still another object of this invention to provide table means which will be able to be handled easily.

It is yet another object of this invention to provide table means, wherein a table body of the table means will be stably kept horizontal and collapsed by simple operation.

In accordance with the present invention, table means for a vehicle is provided. The table means comprises a table body, support means for attaching to a side of a vehicle seat for pivotally supporting the table body, linkage means provided between the support means and the table body for facilitating maintaining of the table body in a horizontal state during use of the table body and facilitating collapsing of the table body after use of the table body, and operating means for operating the linkage means.

The table body may has a hollow portion provided in an interior thereof and attachment means slidably inserted in the hollow portion of the table body. The attachment means is adapted to be drawn in and out of the hollow portion of the table body.

The attachment means includes a tray or a drawer and may include cup holder means. The tray or drawer may include cup holder means.

The operating means comprises lever means pivotally connected to the table body, bracket means, and an operating bar. The operating bar has a first end portion and a second end portion, and is connected at the first end portion thereof to the lever means. The bracket means includes a first bracket member and a second bracket member. The first bracket member is mounted on the table body. The linkage means and the second bracket member are pivotally connected to the first bracket member. The second bracket member is adapted to be abutted at a portion thereof against a portion of the linkage means. The second end portion of the operating bar is movably coupled to the bracket means. When the lever means is operated, the operating bar is pulled whereby the second bracket member is pivoted and pushes the linkage means in such a direction as to cause the linkage means to be operatively bent.

The first bracket member has first elongate hole means. The first elongate hole means includes stopper means rising at substantially a midpoint along a length of the first elongate hole means. The second bracket member has second elongate hole means which is aligned with the first elongate hole means of the first bracket member. The second end portion of the operating bar is movably inserted through the first elongate hole means of the first bracket member and the second elongate hole means of the second bracket member. When any external force is accidentally applied to the linkage means in such a direction as to cause the linkage means to be operatively bent during use of the table body, the second end portion of the operating bar is pushed against the stopper means of the first elongate hole means, whereby bending of the linkage means is prevented. When the lever means is operated thereby pulling the operating bar, the second end portion of the operating bar is moved toward one end of the first elongate hole means while going over the stopper means of the first elongate hole means and causing the second bracket member to be pivoted, whereby the linkage means is pushed by the second bracket member in such a direction as to allow the linkage means to be operatively bent, and then is operatively bent thereby causing the table body to be collapsed.

The linkage means has an upward projecting piece for holding the second end portion of the operating bar. When any external force is accidentally applied to the linkage means in such a direction as to cause the linkage means to be operatively bent, the upward projecting piece is adapted to push the second end portion of the operating bar against the stopper means of the first bracket member.

The support means includes a pair of arm members. The arm members adapted to be attached at their lower end portions to the side of the vehicle seat and stand upwardly from the side of the vehicle seat, when the table means is assembled.

The linkage means includes an upper linkage member and a lower linkage member which are pivotally connected to each other. The lower linkage member is pivotally connected to one of the arm members.

Each of the first and second bracket members has a substantially U-shaped body. The U-shaped body has side plate sections and an intermediate plate section interconnecting the side plate sections. The first bracket member is mounted on the table body with an opened side of the U-shaped body thereof facing downwardly. The second bracket member is arranged in the U-shaped body of the first bracket member with an opened side of the U-shaped body thereof facing upwardly. An upper end of the upper linkage member is located between the first and second bracket members. The first bracket member has the first elongate hole means. The first elongate hole means includes an elongate hole of a substantially circular arc shape which is formed in each of the side plate sections of the first bracket member. The second bracket member has the second elongate hole means. The second elongate hole means includes an elongate hole of a substantially elliptical shape which is formed in each of the side plate sections of the second bracket member. The second end portion of the operating bar is movably inserted through the elongate holes of the first and second bracket members.

The stopper means includes a stopper piece rising at substantially a midpoint along a length of the first elongate hole.

The upper linkage member is provided with the upward projecting piece for holding the second end portion of the operating bar.

Spring means for facilitating causing of the table body to be thrust horizontally during use of the table body may be provided between the support means and the linkage means.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENTS

Table means for a vehicle according to the present invention will be described hereinafter with reference to the accompanying drawings. The table means generally includes a table body, support means for pivotally supporting the table body, linkage means provided between the table body and the support means, and operating means for operating the linkage means.

Figure 1:
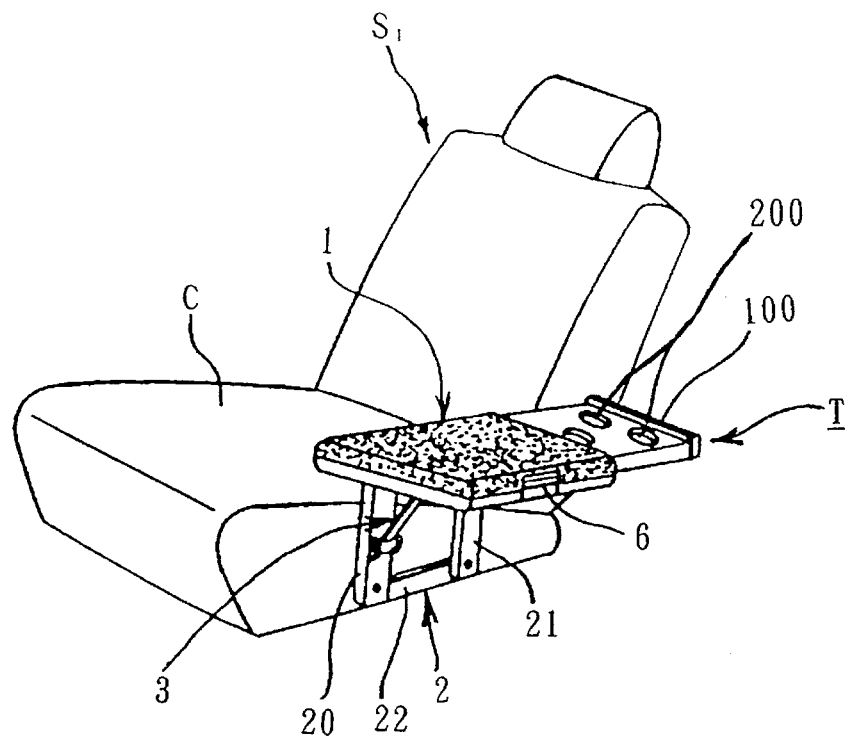
FIG. 1 is a schematic perspective view of a vehicle seat for one person provided with table means for a vehicle according to the present invention, in which a table body of the table means is kept horizontal.

Referring now to FIG. 1, there is schematically illustrated a vehicle seat $S_1$ for one person which is provided with table means T of the present invention at a side of the seat $S_1$. In the illustrated embodiment, the vehicle seat $S_1$ is employed as a driver's seat for a car which is to be used in Japan, and has the table means T provided at the left side of the driver's seat $S_1$. When the table means T is applied to a driver's seat $S_1$ for a car which is to be used in U.S.A., the table means T is provided at the right side of the driver's seat. Also, the table means T may be applied to an assistant driver's seat. When the assistant driver's seat is for a car which is to be used in Japan, the table means T is provided at the right side of the seat. Also, when the assistant driver's seat is for a car which is used in U.S.A., the table means T is provided at the left side of the seat.

Figure 2:
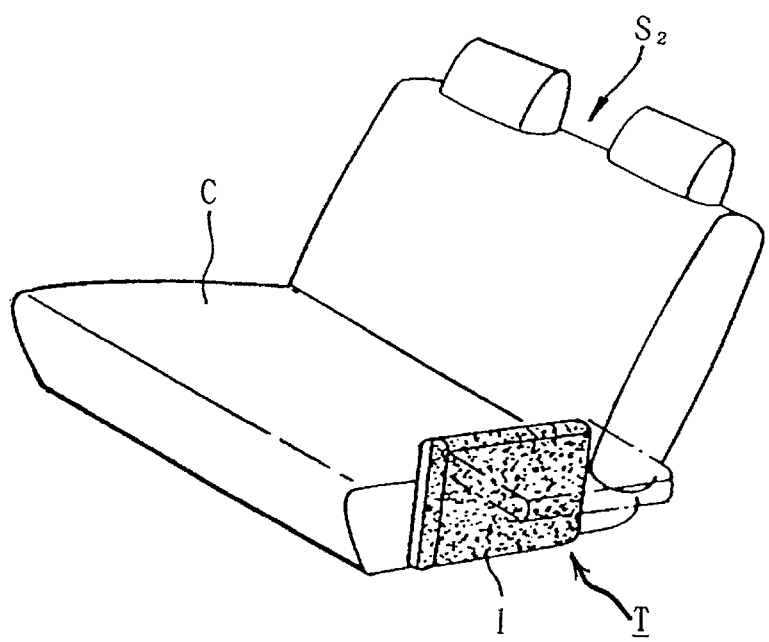
FIG. 2 is a schematic perspective view of a vehicle seat for several persons provided with the table means, wherein the table body of the table means is collapsed.

Referring to FIG. 2, there is schematically illustrated a vehicle seat $S_2$ for several persons which has the table means T of the present invention provided at the left side of the seat $S_2$.

As shown in FIGS. 1 and 2, the table means T includes a table body 1 on which any desired articles are to be put. The table body 1 has an area large enough to allow the articles to be put on the table body 1, and a form suitable for allowing the articles to be put on the table body 1.

Figure 3:
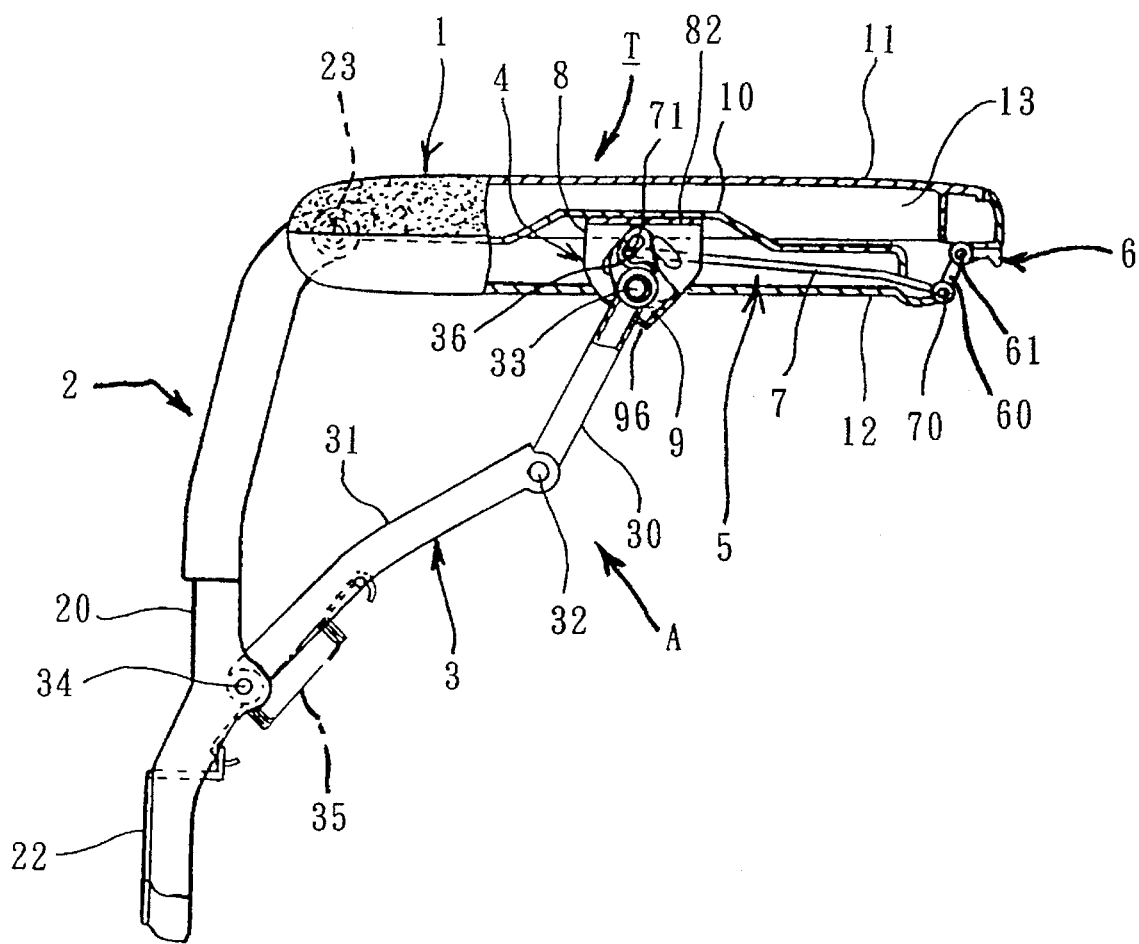
FIG. 3 is a schematic front view of the table means, with a portion of the table body thereof cut away.
Figure 4:
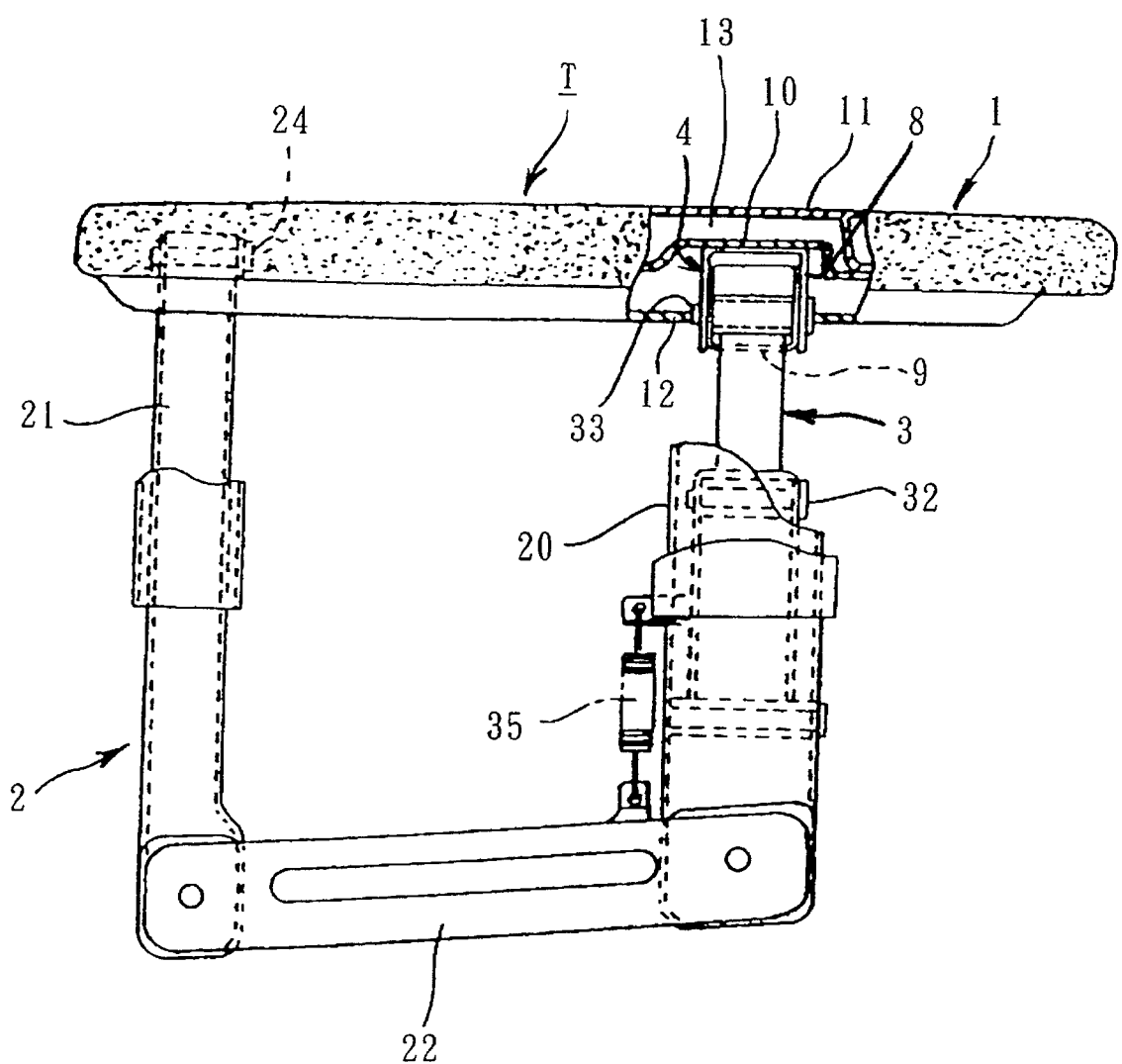
FIG. 4 is a schematic left side view of the table means, with a portion of the table body thereof cut away.

Referring to FIGS. 3 and 4, the table body 1 of the table means T has a base frame 10, an upper cover 11 and a lower cover 12. The table body 1 is formed into a substantially flat shape by assembling the upper cover 11 and lower cover 12 to the base frame 10, and has a hollow portion 13 provided in an interior of the table body 1. As will be discussed hereinafter, any suitable attachment may be slidably inserted in the hollow portion 13 of the table body 1. The table body 1 is pivotally connected to support means 2. The support means 2 includes a pair of arm members 20 and 21, and a connecting plate 22 provided between lower portions of the arm members 20 and 21 for maintaining a space between the arm members 20 and 21. More particularly, lower end portions of the arm members 21 and 22 are attached to a side of a seat cushion C of the seat $S_1$ (or $S_2$) as shown in FIG. 1. The arm members 20 and 21 stand upwardly from the side of the seat cushion C of the seat. The table body 1 is pivotally connected to upper end portions of the arm members 20 and 21 by means of support pins 23 and 24.

As shown in FIG. 3, linkage means 3 is provided between the arm member 20 of the support means 2 and the table body 1. The linkage means 3 acts as means to facilitate maintaining of the table body 1 in a horizontal state within a space about the side of the vehicle seat $S_1$ (or $S_2$) during use of the table body 1, and also acts as means to facilitate collapsing of the table body 1 within the space about the side of the vehicle seat $S_1$ (or $S_2$) after use of the table body 1. More particularly, when the the linkage means 3 is stretched, the table body 1 is adapted to be kept horizontal within the space about the side of the vehicle seat as shown in FIG. 1. Conversely, when the linkage means 3 is operatively bent, the table body 1 is pivoted about the support pins 23 and 24 in a downward direction, whereby the table body 1 is adapted to be collapsed as shown in FIG. 2. The linkage means 3 includes an upper linkage member 30 and a lower linkage member 31. The upper linkage member 30 and lower linkage member 31 are pivotally connected to each other by means of a pin 32, whereby the linkage means 3 can be operatively bent at the pivotally connecting portion of the upper and lower linkage members 30 and 31. An upper end portion of the upper linkage member 30 is connected through a pin 33 to bracket means 4 which is mounted on an undersurface of the base frame 10 of the table body 1. A lower end portion of the lower linkage member 31 is connected to the arm member 20 by means of a pin 34. Provided between the lower linkage member 31 and the connecting plate 22 of the support means 2 is a spring 35 which acts as means to always urge the lower linkage means 31 in such a direction as to allow the linkage means 3 to be stretched.

Figure 5:
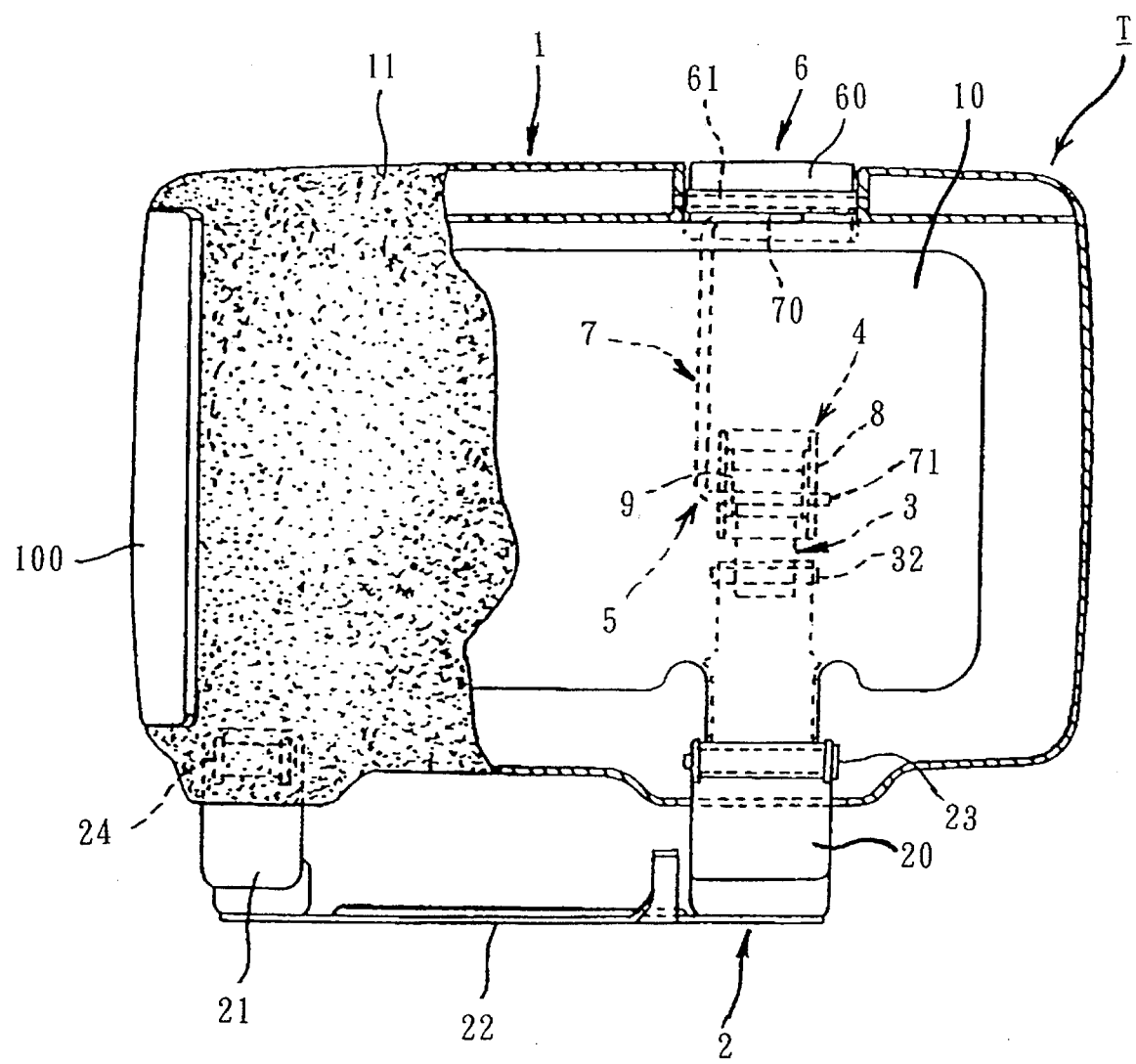
FIG. 5 is a schematic plane view of the table means, with a portion of the table body thereof cut away.

Referring to FIG. 5 and again referring to FIG. 3, the table means T further includes operating means 5 for operating the linkage means 3. The operating means 5 includes lever means 6 arranged at a portion of the table body 1 which is opposite to a portion of the table body 1 which is pivotally connected to the arm members 20 and 21 by means of the support pins 23 and 24. The lever means 6 has a body 60 of a substantially L-shape as shown in FIG. 3. The substantially L-shaped body 60 of the lever means 6 is pivotally connected at a substantially middle section thereof to the base frame 10 of the table body 1 by means of a pin 61. The operating means 5 further includes the bracket means 4 as briefly described above, and an operating bar 7. The operating bar 7 has a body of a substantially U-shape having a first end portion 70 and a second end portion 71 as shown in FIG. 5. The first end portion 70 of the operating bar 7 is pivotally connected to an end portion of the lever body 60.

Figure 6:
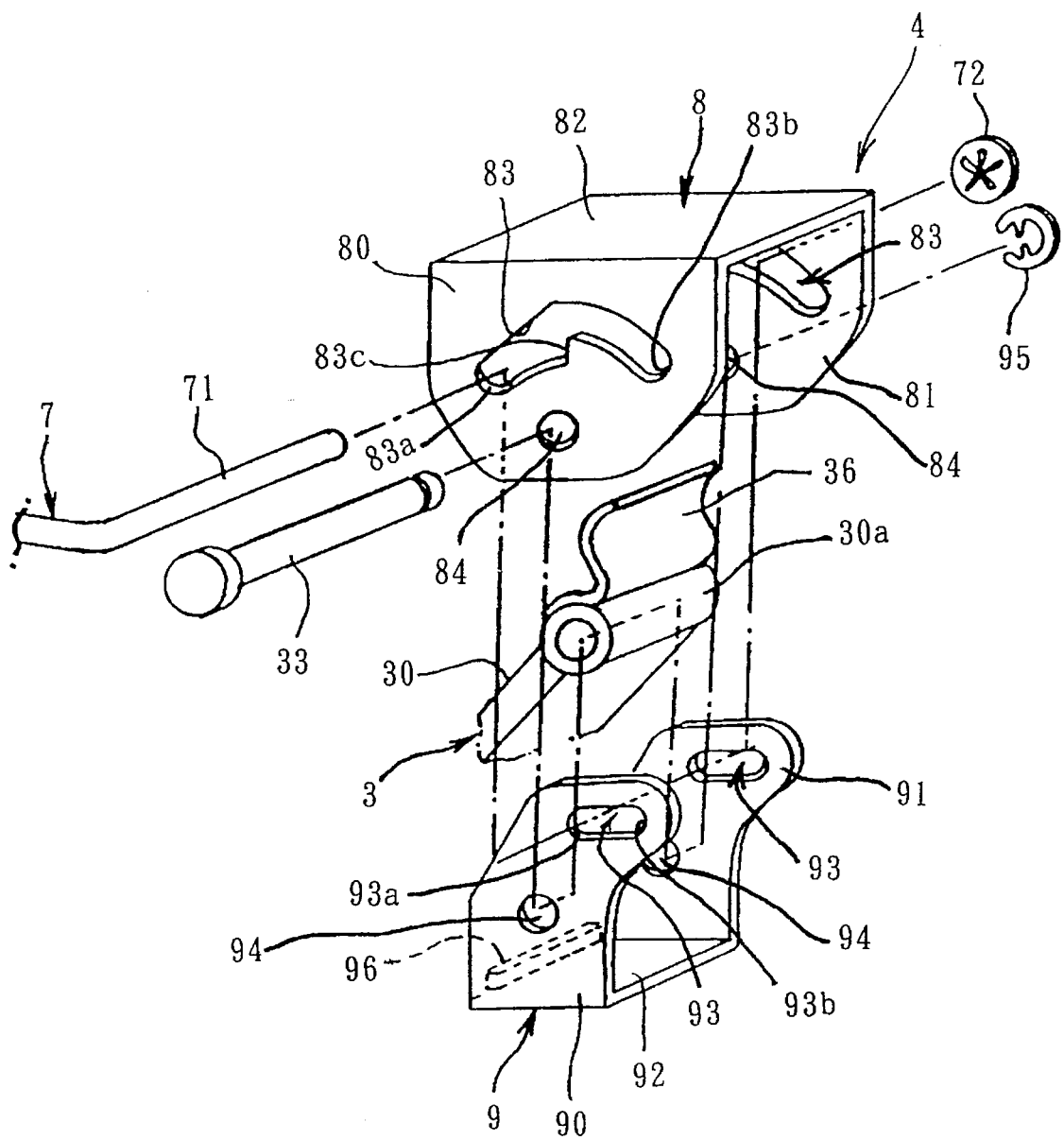
FIG. 6 is a schematic exploded perspective view of operating means.

Referring to FIG. 6, the bracket means 4 includes a first bracket member 8 and a second bracket member 9. Each of the first bracket member 8 and second bracket member 9 has a substantially U-shaped body. The body of the first bracket member 8 has side plate sections 80 and 81, and an intermediate plate section 82 which interconnects the side plate sections 80 and 81 and is attached onto the undersurface of the base frame 10 of the table body 1 as shown in FIG. 3. The first bracket member 8 is attached to the base frame 10 of the table body 1 with an opened side of the U-shaped body thereof facing downwardly. Each of the side plate sections 80 and 81 is formed with an elongate hole 83 of a substantially circular arc shape. The elongate holes 83 of the side plate sections 80 and 81 are aligned with each other. Each of the elongate holes 83 includes a first end portion 83a, a second end portion 83b, and a stopper portion 83c rising at substantially a midpoint along a lower region of the elongate hole 83. Like the body of the first bracket member 8, the body of the second bracket member 9 has side plate sections 90 and 91, and an intermediate plate section 92 which interconnects the side plate sections 90 and 91. The second bracket member 9 is arranged in a space between the side plate sections 80 and 81 of the first bracket member 8 with an opened side of the U-shaped body thereof facing upwardly. Each of the side plate sections 90 and 91 of the second bracket member 9 is formed with an elongate hole 93 of a substantially elliptical shape which includes a first end portion 93a and a second end portion 93b. The elongate holes 93 of the side plate sections 90 and 91 are aligned with each other. Further, the elongate holes 93 of the side plate sections 90 and 91 of the second bracket member 9 are formed at portions of the side plate sections 90 and 91 which positionally correspond to portions of the side plate sections 80 and 81 of the first bracket member 8, at which the elongate holes 83 of the first bracket member 8 are formed, when the bracket means 4 is assembled in such a manner as will be discussed hereinafter.

As shown in FIG. 6, the upper linkage member 30 of the linkage means 3 has a pin receiving portion 30a provided at an upper end thereof. The upper linkage member 30 is pivotally connected to the bracket means 4 by causing holes 94 of the side plate sections 90 and 91 of the second bracket member 9 and the pin receiving portion 30a of the upper linkage member 30 to be aligned with holes 84 of the side plate sections 80 and 81 of the first bracket member 8, and inserting the pin 33 through the holes 84 of the first bracket member 8, the pin receiving portion 30a of the upper linkage member 30 and the holes 94 of the second bracket member 9. A first snap ring 95 is mounted on an end portion of of the pin 33 in order to prevent the table body 1 from removing from the linkage means 3. When the upper linkage member 30 is assembled to the bracket means 4 in such a manner as described above, the elongate holes 83 of the side plate sections 80 and 81 of the first bracket member 8 and the elongate holes 93 of the side plate sections 90 and 91 of the second bracket member 9 are aligned with each other as described above. The pin receiving portion 30a of the upper linkage member 30 is located between the first bracket member 8 and the second bracket member 9. The second bracket member 9 has an upward rising portion 96 provided at a region of the intermediate plate section 92 thereof. The second bracket member 9 is adapted to be abutted at the upward rising portion 96 thereof against a portion of the upper linkage member 30 of the linkage means 3 as shown in FIG. 3.

Again referring to FIG. 6, the second end portion 71 of the operating bar 7 is movably inserted through the elongate holes 83 of the first bracket member 8 and the elongate holes 93 of the second bracket member 9. A second snap ring 72 is mounted on the second end portion 71 of the operating bar 7 in order to prevent the operating bar 7 from removing from the bracket means 4. As described above, the first end portion 70 of the operating bar 7 is pivotally connected to the end portion of the lever body 60. When the lever means 6 is operated by a car driver or fellow passenger, the lever body 60 is pivoted about the pin 61 (see FIG. 3) whereby the operating bar 7 is pulled. The upper linkage member 30 has an upward projecting piece 36 provided at the pin receiving portion 30a thereof for holding the second end portion 71 of the operating bar 7.

Figure 7:
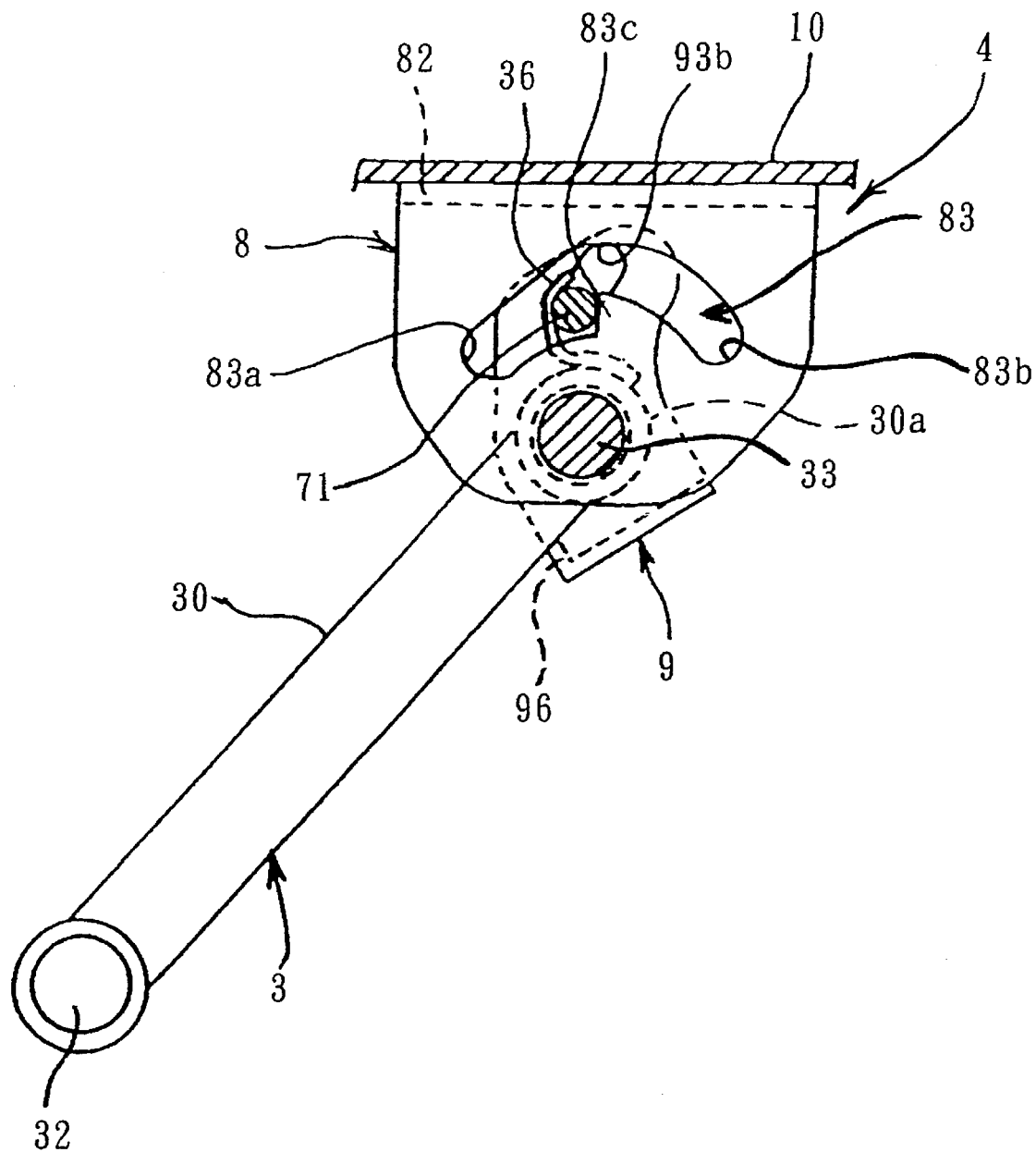
FIGS. 7 and 8 are each a schematic view of assistance in explaining the operation of the table means.
Figure 8:
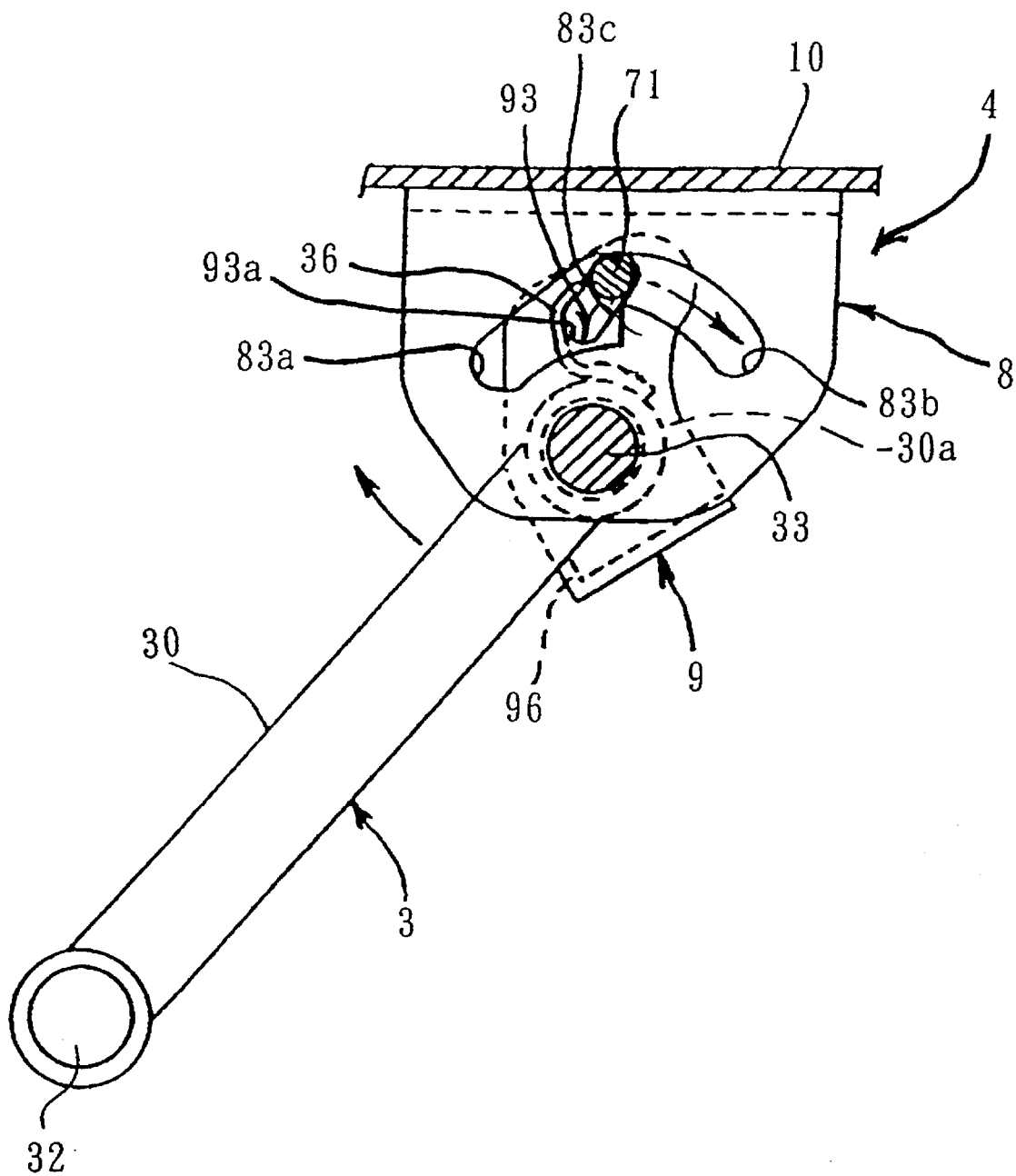

Referring now to FIGS. 7 and 8, the operation of the table means T according to the present invention will be described hereinafter. In a state shown in FIG. 2, when a car driver or fellow passenger is to practically use the table means T of the present invention, the car driver or fellow passenger pushes the table body 1 up by one hand, whereby the linkage means 3 is operatively stretched and the table body 1 is pivoted about the pins 23 and 24 in a counterclockwise direction. Then, the table body 1 is thrust horizontally and stably kept horizontal with resort to the action of the spring 35 as shown in FIG. 3. At this time, the second end portion 71 of the operating bar 7 is adapted to be located at positions between the stopper portions 83c and first end portions 83a of the elongate holes 83 of the first bracket member 8 relative to the elongate holes 83. In this condition, the car driver or fellow passengers can place any desired articles on the table body 1.

In a state shown in FIG. 1, when any external force is accidentally applied to the linkage means 3 in such a direction as to cause the linkage means 3 to be operatively bent, that is, a direction indicated by the arrow A in FIG. 3, the upper linkage member 30 of the linkage means 3 is slightly pivoted about the pin 32 in the opposite direction. At this time, as shown in FIG. 7, the upward projecting piece 36 provided on the pin receiving portion 30a of the upper linkage member 30 pushes the second end portion 71 of the operating bar 7 against the stopper portions 83c of the elongate holes 83 formed in the first bracket member 8, whereby further pivotal movement of the upper linkage member 30 is prevented. As a result, the linkage means 3 is prevented from being operatively bent. Therefore, even though any external force is accidentally applied to the linkage member 3, the table body 1 is still kept horizontal.

When the table body 1 is to be collapsed after use of the table body 1, the lever means 6 is operated by the car driver's or fellow passenger's one hand, whereby the lever body 60 is pivoted about the pin 61. Simultaneously with the pivotal movement of the lever body 60, the operating bar 7 is pulled as a whole, whereby the second end portion 71 of the operating bar 7 is moved from the first end portions 93a to the second end portions 93b of the elongate holes 93 of the second bracket member 9 relative to the elongate holes 93 while going over the stopper portions 83c of the elongate holes 83 of the first bracket member 8 as shown in FIG. 8. By further pulling of the operating bar 7, the second end portion 71 of the operating bar 7 is moved toward the second end portions 83b of the elongate holes 83 of the first bracket member 8 and causes the second bracket member 9 to be pivoted about the pin 33. At this time, the rising portion 96 of the second bracket member 9 is abutted against and pushes the upper linkage member 30. When the upper linkage member 30 is pushed by the rising portion 96 of the second bracket member 9, the linkage means 3 is operatively bent at the portion thereof at which the upper linkage member 30 and the lower linkage member 31 are pivotally connected to each other by the pin 32. By the operatively bending of the linkage means 3 and own weight of the table body 1, the table body 1 is pivoted about the pins 23 and 24 and collapsed as shown in FIG. 2. At this time, the upward projecting piece 36 of the upper linkage member 30 is adapted to be located at a position near the first end portions 83a of the elongate holes 83 of the first bracket member 8 relative to the elongate holes 83 of the first bracket member 8.

As described above, the table body 1 is pivoted about the pins 23 and 24 by only operating the lever means, so that the driver or fellow passenger can easily handle the table body 1. The table means T may further include any suitable attachment, for example, a tray, a drawer or the like which is slidably inserted in the hollow portion 13 (see FIG. 3) of the table body 1 and is adapted to be drawn in and out of the hollow portion 13 of the table body 1. As shown in FIG. 1, the table means T of FIG. 1 includes a tray 100 as one example of such attachments. The tray 100 includes any suitable cup holder means 200. When the table means T provided with the tray 100 is applied to a driver's seat or assistant driver's seat, the tray 100 is adapted to be drawn backward from the table body 1. In this case, the driver and assistant driver can use the table body 1 and a fellow passenger who has sat on a back seat can use the tray 100. Thus, the table means T provided with such attachment 100 will enable a space, on which any desired articles are allowed to be placed, to be enlarged by drawing the attachment out of the table body 1.

Figure 9:
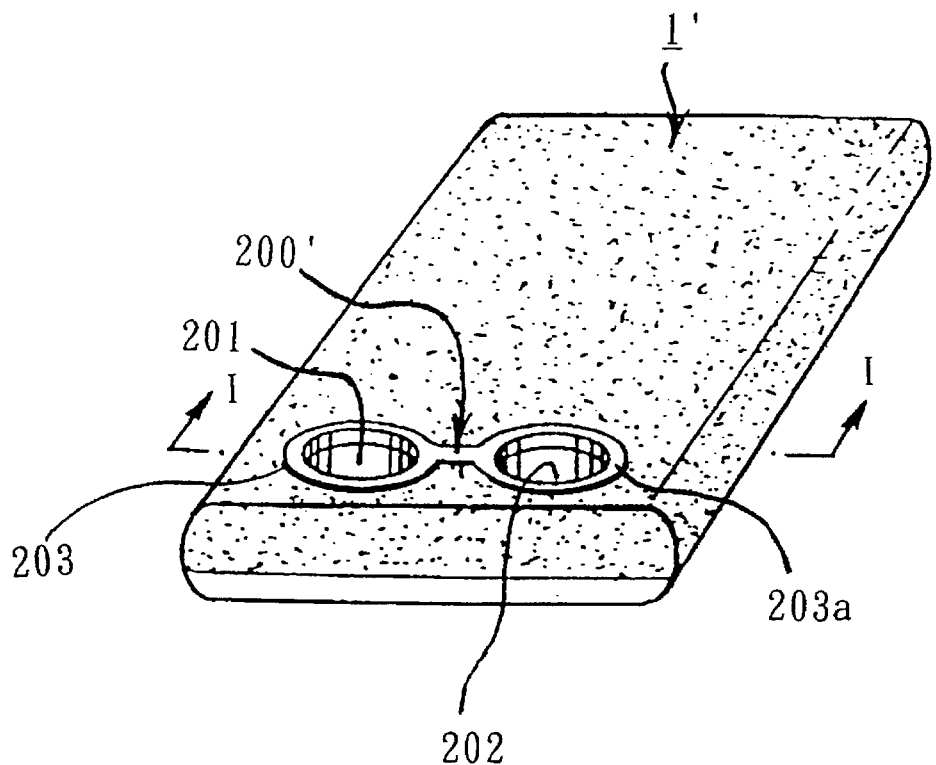
FIG. 9 is a schematic perspective view showing a modification of the table body shown in FIGS. 1–5.
Figure 10:
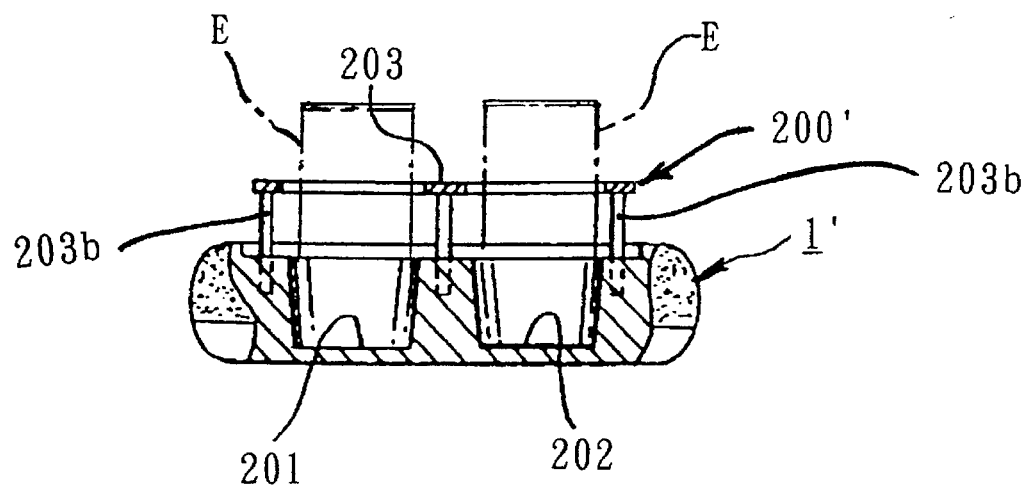
FIG. 10 is a schematic vertical sectional view of the table body shown in FIG. 9, taken on a plane indicated in FIG. 9 by a line I—I.

Referring to FIGS. 9 and 10, there is schematically illustrated a modification of the table body 1 shown in FIGS. 1–5. This modification is substantially similar to the table body 1 shown in FIGS. 1–5 except that a table body 1' itself includes any suitable cup holder means 200'. The cup holder means 200' includes recess portions 201 and 202 formed at an upper surface portion of the table body 1', and up-and-down movable holder frame 203. The holder frame 203 has a substantially figure-8-shaped body 203a, and legs 203b extending downwardly from the body 203a. The holder frame 203 is arranged on the table body 1' in such a manner that the substantially figure-8-shaped body 203a thereof surrounds the recess portions 201 and 202 of the table body 1' and the legs 203b are movably inserted in the table body 1'. In a state where the holder frame 203 is at an upward position as shown in FIG. 10, cups E are inserted in the recess portions 201 and 202 through the holder frame 203 and can be stably held by means of the holder frame 203.

The table body 1' of FIGS. 9 and 10 may include a tray 100 with such cup holder means 200 as described above with reference to FIG. 1. When such table body 1' provided with the tray is applied to a car driver's or assistant driver's seat and the tray with the cup holder means is adapted to be drawn backward from the table body 1', the driver and assistant driver can use the table body 1' in order to hold their cups on the table body 1' through the cup holder means 200' and fellow passengers having sat on a back seat can use the tray in order to hold their cups on the tray through the cup holder means of the tray. Thus, when the table body 1' provided with the tray is employed, both a driver (and assistant driver) and fellow passengers can simultaneously use the table means.

It will be appreciated that the table means according to the present invention does not confine a space before a fellow passenger who has sat on a back seat in a vehicle, since the table means is arranged at the side of a front seat, driver's or assistant driver's seat or back seat and the table body is adapted to be kept horizontal and collapsed within a space about the side of the seat.

It will be also appreciated that the table means according to the present invention enables a space within a vehicle to be efficiently used. Particularly, when the table means of the present invention is employed in a car of walk-through type such as a camping car or a wagon car which is adapted to allow fellow passengers to walk about in the car, the table means of this invention is favorable.

The term and expressions which have been employed are used as terms of description and not of limitation, and there is no intention in the use of such terms and expression of excluding any equivalents of the features shown and described, or portions thereof, but it is recognized that various modifications are possible within the scope of the invention claimed.

What is claimed is:

1. Table means for a vehicle comprising:

a table body;

support means for attaching to a side of a vehicle seat for pivotally supporting said table body;

linkage means provided between said table body and said support means for facilitating maintaining of said table body in a horizontal state during use of said table body and facilitating collapsing of said table body after use of said table body; and operating means for operating said linkage means;

said operating means comprising lever means pivotally connected to said table body, bracket means including a first bracket member and a second bracket member, and an operating bar having a first end portion and a second end portion;

said first bracket member being attached to said table body;

said operating bar being connected at said first end portion thereof to said lever means and movably coupled at said second end portion thereof to said bracket means; and said linkage means and said second bracket member being pivotally connected to said first bracket member.

2. Table means as defined in claim 1, wherein said table body has a hollow portion provided in an interior thereof, and attachment means slidably received in said hollow portion of said table body, said attachment means being adapted to be drawn in and out of said hollow portion of said table body.

3. Table means as defined in claim 2, wherein said attachment means includes a tray or a drawer.

4. Table means as defined in claim 3, wherein said tray or drawer is provided with cup holder means.

5. Table means as defined in claim 2, wherein said attachment means is provided with cup holder means.

6. Table means as defined in claim 1, wherein said first bracket member has first elongate hole means, said first elongate hole means including stopper means rising at substantially a midpoint along a length of said first elongate hole means, wherein said second bracket member has second elongate hole means which is aligned with said first elongate hole means of said first bracket member, wherein the second end portion of said operating bar is movably inserted through said first elongate hole means of said first bracket member and said second elongate hole means of said second bracket member, and wherein when any external force is accidentally applied to said linkage means in such a direction as to cause said linkage means to be operatively bent during use of said table body, the second end portion of said operating bar is pushed against said stopper means of said first elongate hole means whereby bending of said linkage means is prevented, and when said lever means is operated thereby pulling said operating bar, the second end portion of said operating bar is moved toward one end of said first elongate hole means while going over said stopper means of said first elongate hole means and causing said second bracket member to be pivoted, whereby said linkage means is pushed by said second bracket member in such a direction as to allow said linkage means to be operatively bent, and then is operatively bent thereby causing said table body to be collapsed.

7. Table means as defined in claim 6, wherein said linkage means has an upward projecting piece for holding the second end portion of said oeprating bar, said upward projecting piece being adapted to push the second end portion of said operating bar against said stopper means of said first elongate hole means when any external force is accidentally applied to said linkage means in such a direction as to cause said linkage means to be operatively bent.

8. Table means for a vehicle comprising:

a table body;

support means for pivotally supporting said table body;

linkage means for facilitating maintaining of said table body in a horizontal state during use of said table body and facilitating collapsing of said table body after use of said table body; and operating means for operating said linkage means;

said support means including a pair of arm members;

said arm members being adapted to be attached at their lower end portions to a side of a vehicle seat and standing upwardly from the side of said vehicle seat, when said table means is assembled;

said linkage means including an upper linkage member and a lower linkage member which are pivotally connected to each other;

said lower linkage member being pivotally connected to one of said arm members;

said operating means including lever means, bracket means, and an operating bar;

said lever means pivotally connected to said table body;

said bracket means including a first bracket member mounted on said table body and a second bracket member;

said upper linkage member and said second bracket member being pivotally connected to said first bracket member; and said operating bar having a first end portion and a second end portion, and being connected at the first end portion thereof to one end of said lever means and movably coupled at the second end portion thereof to said bracket means.

9. Table means as defined in claim 8, wherein each of said first and second bracket members has a substantially U-shaped body, said U-shaped body having side plate sections and an intermediate plate section interconnecting said side plate sections, wherein said first bracket member is mounted on said table body with an opened side of said U-shaped body thereof facing downwardly, wherein said second bracket member is arranged in said U-shaped body of said first bracket member with an opened side of said U-shaped body thereof facing upwardly, wherein an upper end of said upper linkage member is located between said first and second bracket members, wherein each of said side plate sections of said first bracket member is formed with a first elongate hole of a substantially circular arc shape, wherein each of said side plate sections of said second bracket member is formed with a second elongate hole of a substantially elliptical shape, and wherein the second end portion of said operating bar is inserted through said elongate holes of said first and second bracket members.

10. Table means as defined in claim 9, wherein said first elongate hole of said first bracket member includes a stopper portion rising at substantially a midpoint along a length of said first elongate hole.

11. Table means as defined in claim 10, wherein said upper linkage member has an upward projecting piece for holding the second end portion of said operating bar.

12. Table means as defined in claim 8, further including spring means provided between said support means and said linkage means for facilitating causing of said table body to be thrust horizontally during use of said table body.

13. Table means as defined in claim 8, wherein said table body has a hollow portion provided in an interior thereof, and attachment means slidably received in said hollow portion of said table body, said attachment means being adapted to be drawn in and out of said hollow portion of said table body.

14. Table means as defined in claim 13, wherein said attachment means includes a tray or a drawer.

15. Table means as defined in claim 14, wherein said tray or drawer is provided with cup holder means.

16. Table means as defined in claim 13, wherein said attachment means is provided with cup holder means.

* * * * *